May 14, 1929.  J. S. BRADY  1,713,370
SELF CLEANING SPIGOT FILTER
Filed Dec. 28, 1927
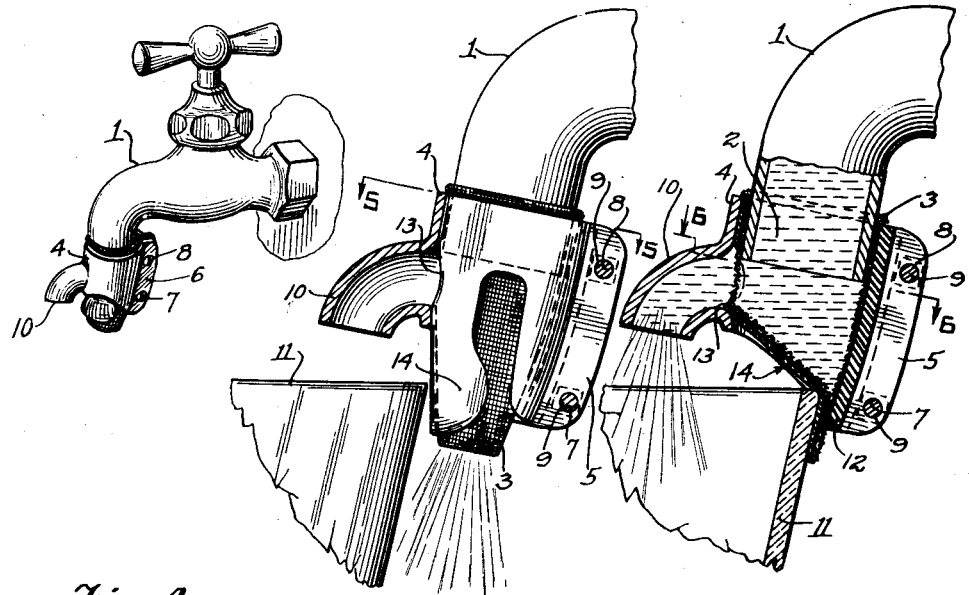
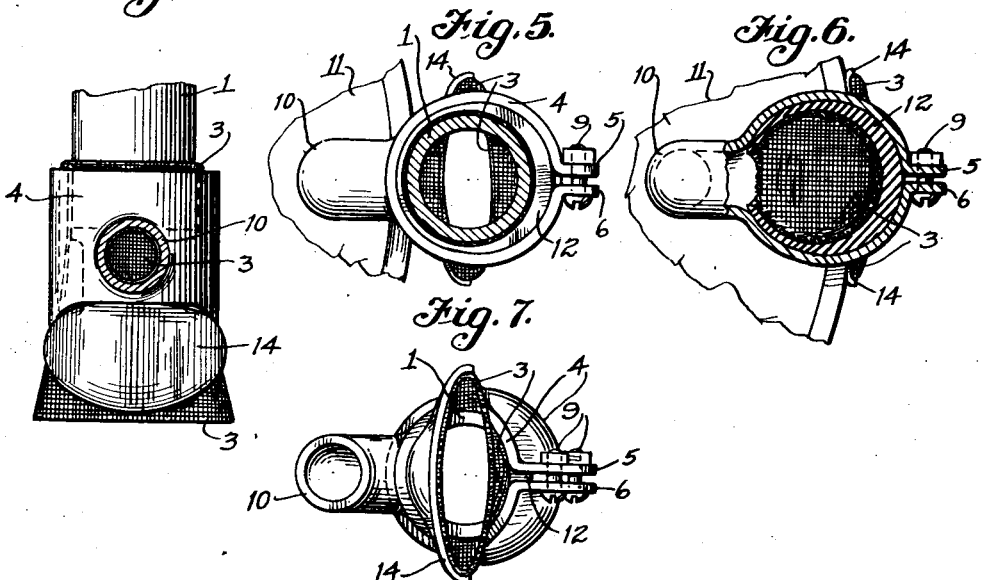
Inventor
John S. Brady Patented May 14, 1929.

1,713,370

UNITED STATES PATENT OFFICE.

JOHN S. BRADY, OF WILKES-BARRE, PENNSYLVANIA.

SELF-CLEANING SPIGOT FILTER.

Application filed December 28, 1927. Serial No. 243,023.

This invention relates to improvements in a filter adapted for use in co-operation with faucets or spigots of the ordinary type.

An object of this invention is to provide a sanitary self-cleaning spigot filter which will function to supply clean water through a suitable filter screen in such a manner that the water will not be obliged to pass through the sediment and objectionable matter which accumulates on the horizontal filter screen ordinarily used.

One of the chief objections to the filter commonly used on faucets for the purpose of supplying drinking water is that sediment, small fish, toads, lizards, bugs or insects of more or less minute size are caught in the filter screen and much of it is washed therethrough into the drinking glass in spite of the fineness of the filter screen cloth. This invention provides a filter wherein the inner surface of the screen is always maintained in clean and sanitary condition by reason of the flow of water through the sediment chamber before, after and even while filling the glass with drinking water, the filter tube at its lower end not being entirely closed, thereby allowing a free flow of water and a continual movement of sediment and other objectionable matter from the filter chamber and screen.

A further object of this invention is to provide a sanitary self-cleaning spigot filter adapted particularly for supplying clean drinking water whereby the flow of water may be regulated by merely pressing the drinking glass or other receptacle against the flexible surface of the filter screen or the flexible cover thereover.

Other objects of this invention will appear from the following detailed description of the device and as disclosed in the two sheets of drawings which are herewith made a part of this invention.

In the drawings—

Figure 1 illustrates a perspective view of a faucet or spigot in assembled relationship with the self-cleaning filter.

Figure 2 illustrates a side elevational view of the filter in operative relationship with the raw water delivering end of a spigot or faucet and a drinking glass, disclosing the filter liquid supply nozzle in section.

Figure 3 represents a vertical sectional view of the sanitary filtering device in co-operation with a raw water delivery, a drinking glass and a supply nozzle for delivering the filtered liquid into the drinking glass, the normal outlet of the filter in this instance being approximately closed by the pressure of the drinking glass against a flexible portion.

Figure 4 illustrates a front elevational view disclosing the filter screen, the flexible wearing pad in connection therewith and the clamping member adapted to retain the filtering device in assembled relationship on the delivering end of a raw water supply.

Figure 5 represents a sectional view of Figure 2 taken along line 5—5.

Figure 6 illustrates a sectional view of Figure 3 taken along line 6—6.

Figure 7 illustrates a bottom plan view of Figure 2.

In the sanitary self-cleaning spigot filter, according to this invention, it is preferred that numeral 1 designates a spigot or faucet of the usual type adapted for supplying raw drinking water in an entirely unfiltered condition or as received from the city mains or other similar sources. A faucet 1 may be made of any suitable material and the delivering end 2 thereof is adapted for receiving in attached relationship thereto a filter screen material 3 made of fine mesh wire or otherwise. The filter screen 3 is of flexible material and may be fastened to the spigot or faucet in any suitable manner, such as, for instance, by means of a clamping member 4 adapted to be made of hard rubber or other material suitable for the purpose and provided with outwardly extending lug portions 5 and 6, openings 7 and 8 being provided in the lug portions for receiving clamping screw elements 9. The clamping member 4 is preferred to have integrally formed therewith a nozzle 10 for delivering filtered water into a drinking glass or other receiving element 11.

In order to avoid undue wear on the delicate structure of the filtering screen material 3, it is preferred in this invention to provide a partial surface covering 12, which may be made of rubber or otherwise, the front portion of the covering 12 is provided with a suitable opening therein as at 13 through which the filtered water may flow into the nozzle 10 and deliver to the drinking glass 11. An apron portion 14 is also formed in the cover or casing 12 and adapted to cover particularly that portion of the filter screen 3 which ordinarily contacts with the drinking glass when in operation, thereby eliminating the wear on the filter screen material. The covering or casing 12 may be constructed having various thicknesses. For instance, the apron portion 14 should have considerable flexibility, at least that equivalent to the filtering material 3, while the side and rear portions of the covering 12 may be made of greater thickness, thereby aiding materially in strengthening the device and holding it in general and operative relationship with the portion 2 of the faucet. As one method for locating the self-cleaning filter on the portion 2 of a faucet, it may be suggested that the filter screen 3 properly encased by the covering 12 be forced a distance upwardly around the portion 2 of the faucet 1, then the clamping member 4 including the outlet nozzle 10 may be brought into position over the screen 3 and casing 12 and, by means of the clamping screws 9, the filtering device may be firmly clamped or attached to the portion 2 of nozzle 1. The lug portions 5 and 6 on the clamping member 4 not only aid in bringing the necessary tension to bear and hold the filter in position on the faucet, but they also act as a substantial re-enforcement or backing for receiving the pressure of the drinking glass or other member when the device is being operated. The top opening of the filter device is made to conform with the shape of the faucet portion 2 while the lower or outlet portion of the filter screen 3 may be formed oval in shape, as clearly disclosed in Figures 4, 5 and 7. The oval shape at the lower end of the filter screen will result in giving the most efficient surface against which force is exerted for approximately or fully closing the lower end of the filter. It is to be understood that the general shape of the filter screen casing therefor and the clamping members may be changed without affecting the merits of this invention.

In operation, this invention provides a sanitary, self-cleaning spigot filter, whereby clean, filtered water may be obtained through a screen without passing through the retained sediments and objectionable matter found in the ordinary type of filter. It is always, more or less, inconvenient to remove the old type of filter for cleaning purposes and invariably there is found a miscellaneous collection of small fish, toads, lizards and the like. The device, according to this invention, will be perpetually cleaned and filtered owing to the fact that the flow of water therethrough, when desired, acts as a complete remover of the sediment and objectionable matter.

Clean, filtered water may be easily obtained for drinking purposes by means of this invention. The drinking glass may be lightly pressed against the lower portion of the filter until the normal flow of water approximately ceases, when a clear, clean filtered stream of drinking water will flow into the glass, after which the glass is removed from the faucet and the water may be allowed to flow from the filter in the usual manner, or the valve closed on the raw water supply.

Regarding the particular form of screen wire or cloth which may be used in this invention, it is preferred that the mesh of the material be of such a fineness that the water will properly discharge therethrough. The forms of the invention disclosed in Figures 1 and 2 eliminate the probability of the filtered water leaking from the device and failing to be received into the receptacle.

It is to be understood that alterations and changes may be made in the above disclosure, both in the drawings and specification, within the scope of the appended claims without affecting the merits of this invention.

What I claim is:

1. In a raw water filtering device, a flexible filter screen, a resilient casing for the filter screen, a spigot for supplying raw water, means for attaching the filter screen and casing on the spigot consisting of a clamping member having integrally formed therewith a nozzle for delivering filtered water.

2. In a raw water filtering device, a flexible filter screen, a resilient casing for the filter screen, a spigot for supplying raw water, means for attaching the filter screen and casing on the spigot consisting of a clamping member having integrally formed therewith a nozzle for delivering filtered water, downwardly extending lug elements at the rear of the clamping member adapted to be brought under tension.

3. In a raw water filtering device, a flexible filter screen, a resilient casing for the filter screen, a spigot for supplying raw water, means for attaching the filter screen and casing on the spigot consisting of a clamping member having integrally formed therewith a nozzle for delivering filtered water, downwardly extending lug elements at the rear of the clamping member adapted to be brought under tension, downwardly extending apron portions in the rear of the clamping member for further re-enforcing the device.

4. In a raw water filtering device, a flexible filter screen, a resilient casing for the filter screen, a spigot for supplying raw water, means for attaching the filter screen and casing on the spigot consisting of a clamping member having integrally formed therewith a nozzle for delivering filtered water, downwardly extending lug elements at the rear of the clamping member adapted to be brought under tension, downwardly extending apron portions in the rear of the clamping member for further re-enforcing the device, the resilient casing for the filter screen having an opening in the front thereof through which filtered water is adapted to flow into the nozzle.

5. In a raw water filtering device, a flexible filter screen, a resilient casing for the filter screen, a spigot for supplying raw water, means for attaching the filter screen and casing on the spigot consisting of a clamping member having integrally formed therewith a nozzle for delivering filtered water, downwardly extending lug elements at the rear of the clamping member adapted to be brought under tension, downwardly extending apron portions in the rear of the clamping member for further re-enforcing the device, the resilient casing for the filter screen having an opening in the front thereof through which filtered water is adapted to flow into the nozzle, a downwardly extending apron portion for the casing and, in the front thereof, for protecting the filter screen from wear.

6. In a raw water filtering device, a flexible filter screen, a resilient casing for the filter screen, a spigot for supplying raw water, means for attaching the filter screen and casing on the spigot consisting of a clamping member having integrally formed therewith a nozzle for delivering filtered water, downwardly extending lug elements at the rear of the clamping member adapted to be brought under tension, downwardly extending apron portions in the rear of the clamping member for further re-enforcing the device, the resilient casing for the filter screen having an opening in the front thereof through which filtered water is adapted to flow into the nozzle, a downwardly extending apron portion for the casing and, in the front thereof, for protecting the filter screen from wear, the lower portion of the filter screen being normally open for allowing water to flow therefrom.

7. In a raw water filtering device, a flexible filter screen, a resilient casing for the filter screen, a spigot for supplying raw water, means for attaching the filter screen and casing, on the spigot consisting of a clamping member having integrally formed therewith a nozzle for delivering filtered water, downwardly extending lug elements at the rear of the clamping member adapted to be brought under tension, downwardly extending apron portions in the rear of the clamping member for further re-enforcing the device, the resilient casing for the filter screen having an opening in the front thereof through which filtered water is adapted to flow into the nozzle, a downwardly extending apron portion for the casing and, in the front thereof, for protecting the filter screen from wear, the lower portion of the filter screen being normally open for allowing water to flow therefrom, and having flexible qualities whereby pressure may be brought to bear against the downwardly extending front apron portion of the casing effectively closing the lower opening and forcing the filtered water to deliver from the nozzle.

In testimony whereof I affix my signature.

JOHN S. BRADY.